United States Patent [19]

Sauer

[11] Patent Number: 4,948,178

[45] Date of Patent: Aug. 14, 1990

[54] HOSE FITTING WITH DEFORMABLE SLEEVE

[75] Inventor: Heinz Sauer, Ronneburg, Fed. Rep. of Germany

[73] Assignee: Rasmussen GmbH, Maintal, Fed. Rep. of Germany

[21] Appl. No.: 371,745

[22] Filed: Jun. 26, 1989

[30] Foreign Application Priority Data

Jun. 30, 1988 [DE] Fed. Rep. of Germany ....... 3822041

[51] Int. Cl.$^5$ .............................................. F16L 33/20
[52] U.S. Cl. ..................................... 285/242; 285/39; 285/256
[58] Field of Search ................. 285/256, 242, 382, 39, 285/420

[56] References Cited

U.S. PATENT DOCUMENTS

| 224,586 | 2/1880 | Earle | 285/242 |
|---|---|---|---|
| 2,314,236 | 3/1943 | Mott | 285/256 |
| 2,614,304 | 10/1952 | Oetiker | 285/256 X |
| 4,402,113 | 9/1983 | Smith | 285/420 X |

FOREIGN PATENT DOCUMENTS

| 3425879 | 10/1985 | Fed. Rep. of Germany | 285/256 |
|---|---|---|---|
| 1547508 | 11/1968 | France | 285/256 |
| 995906 | 6/1965 | United Kingdom | 285/256 |

*Primary Examiner*—Dave W. Arola
*Attorney, Agent, or Firm*—Peter K. Kontler

[57] ABSTRACT

A hose fitting wherein the free end of a nipple or pipe is sealingly held in one end portion of a hose by a sleeve having a tubular body with a single axially parallel slot and one or more bridges extending across the slot at the exterior of the tubular body. The latter has depressions which extend toward the nipple or pipe to urge the end portion of the hose into sealing engagement with the nipple or pipe. The sleeve can be detached from the end portion of the hose by partially or fully destroying, by deforming or by removing the bridge or bridges so that the slot can be widened prior to separation of the sleeve from the hose.

6 Claims, 3 Drawing Sheets

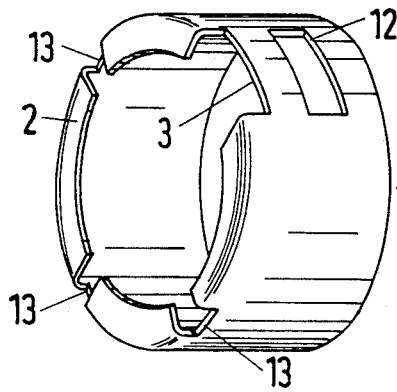
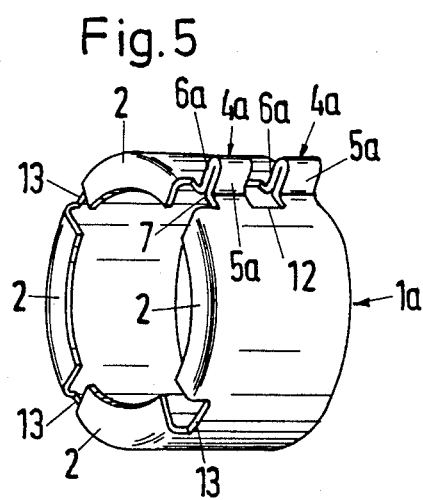
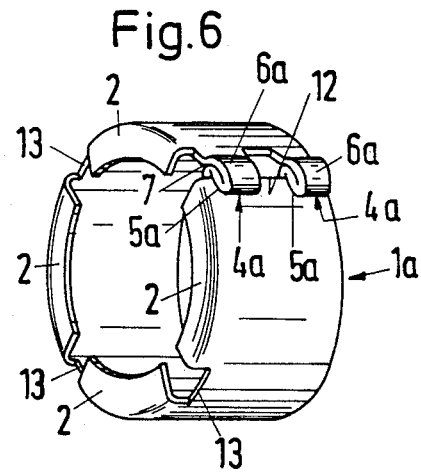
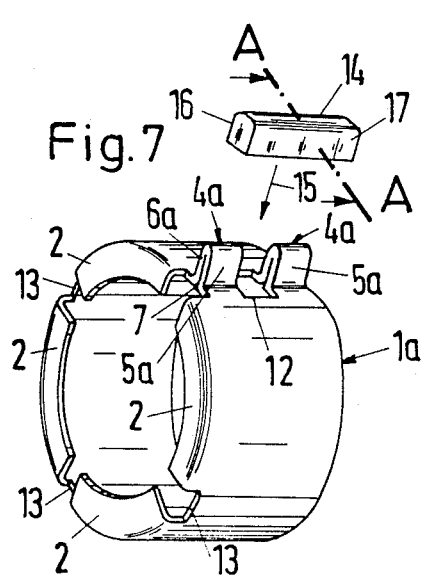
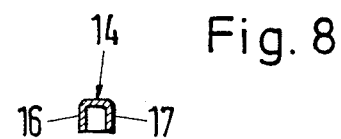
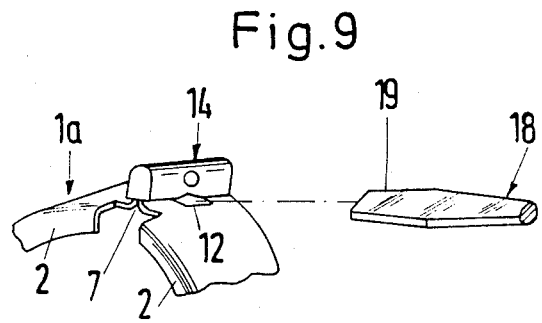

4,948,178

HOSE FITTING WITH DEFORMABLE SLEEVE

BACKGROUND OF THE INVENTION

The invention relates to hose fittings in general, and more particularly to improvements in hose fittings of the type wherein one end of a hose which is slipped onto a nipple or another tubular member is maintained in sealing engagement with the tubular member by a deformable sleeve.

It is well known to provide a hose fitting with a deformable sleeve which serves to more or less permanently affix the end portion of a hose to an inserted nipple or a like tubular member. A drawback of many hose fittings of such character is that the sleeve cannot be readily separated from the end portion of the hose or cannot be separated at all without causing damage to or total destruction of the end portion of the hose. This presents problems if the major part of the hose is still intact because the hose must be discarded or a substantial length of the hose must be scrapped whenever it becomes necessary to remove the deformed sleeve.

U.S. Pat. No. 2,314,236 to Mott discloses a hose fitting wherein a cylindrical sleeve can be converted into a smaller cylinder which tightly surrounds the end portion of a hose to thereby urge the end portion of the hose into sealing engagement with the external surface of a nipple or another tubular member. Conversion of the sleeve into a smaller cylinder entails the formation of two flattened external loops which constitute axially parallel external ribs or flanges and are located diametrically opposite each other. The patentee proposes to partially destroy or completely remove one of the ribs to thus establish a slot which can be widened to permit detachment of the cylinder from the end portion of the hose. A drawback of the patented hose fitting is that the two ribs project beyond spaced-apart portions of the deformed sleeve and thus occupy room which is not always available for a hose fitting. Moreover, deformation of the internal surface of the sleeve is negligible so that the form-locking engagement with the end portion of the hose is tenuous, especially at elevated pressures in the hose.

OBJECTS OF THE INVENTION

An object of the invention is to provide a novel and improved hose fitting which is simpler but more reliable and less expensive than heretofore known fittings.

Another object of the invention is to provide a hose fitting wherein the deformed sleeve can be readily separated from the end portion of a hose.

A further object of the invention is to provide a fitting wherein the sleeve is configurated and can be deformed in such a way that its detachment does not entail any damage to or destruction of the hose.

An additional object of the invention is to provide a novel and improved sleeve which can be used in the above outlined hose fitting.

Still another object of the invention is to provide a sleeve which can engage the end portion of a hose with a great force in spite of the fact that it is readily separable from the hose.

A further object of the invention is to provide a novel and improved method of making sleeves for use in the above outlined hose fittings.

Another object of the invention is to provide the sleeve with novel and improved means for facilitating its separation from a hose.

SUMMARY OF THE INVENTION

The invention is embodied in a sleeve which can be used to secure one end of a tubular member (e.g., a metallic or plastic nipple) in the end portion of a deformable hose. The improved sleeve comprises a radially inwardly deformable tubular body which serves to surround the end portion of the hose and to urge the end portion of the hose against the one end of the tubular member as a result of radially inward deformation of the tubular body. The tubular body has a substantially axially parallel slot and includes two elongated marginal portions which flank the slot. The sleeve further comprises at least one bridge which extends across the slot externally of the tubular body and is connected with the marginal portions. The connection between the at least one bridge and at least one of the marginal portions is a separable connection which permits widening of the slot preparatory to separation of deformed tubular body from the end portion of the hose.

The at least one bridge is preferably integral with at least one of the marginal portions, i.e., it can be made of one piece with the one marginal portion.

In accordance with one presently preferred embodiment, the at least one bridge includes two sections each of which is integral with a different marginal portion of the tubular body. Such sections of the at least one bridge can extend substantially radially outwardly from the tubular body and can be integral with one another. The at least one bridge can further comprise means for coupling the sections to each other in addition to or in lieu of an integral connection between the sections.

One section of the at least one bridge can overlie the other section and the other section can overlie the respective marginal portion of the tubular body.

The connection between the two sections of the at least one bridge can be a form-locking connection. For example, one of the sections can be provided with a slit through which the other section extends. The one section preferably overlies the marginal portion which is integral with the other section, and the other section overlies or can overlie the one section.

The sections of the at least one bridge can be disposed side-by-side, and the at least one bridge can further comprise means for connecting relatively small portions of the sections to each other. For example, the connecting means can include means for establishing a bond between the materials of the relatively small portions of the sections, e.g., in that the relatively small portions of the two sections are spot welded to each other.

The sleeve can comprise a plurality of bridges which are disposed one behind the other in the longitudinal direction of the slot. The bridges can include a first bridge and a second bridge with a clearance between the first and second bridges. The aforementioned coupling means can include a portion which extends into the clearance. The coupling means can constitute, include or resemble a hood which confines the sections of the bridge or bridges. Alternatively, the coupling means can include an annulus which surrounds the sections of one or more bridges. At least one section of the at least one bridge or of at least one of a plurality or bridges can overlie the annulus.

It is further within the purview of the invention to provide the sleeve with at least one bridge which is integral with one marginal portion of the tubular body and overlaps the other marginal portion. The bridge can be welded, glued or otherwise bonded to the other marginal portion, and such bridge can further comprise an extension (e.g., in the form of a tongue or lug) which projects from the other marginal portion (either circumferentially of the tubular body or radially of and away from the external surface of the tubular body).

The sleeve can be reinforced by the provision of an annular flange which is integral with one end of and extends substantially radially inwardly from the tubular body. Such flange can be provided with one or more recesses in the form of cutouts or the like which are spaced apart from the slot in the circumferential direction of the tubular body. The flange can overlie and conceal the end portion of the hose when the tubular body is placed around such end portion.

The novel features which are considered as characteristic of the invention are set forth in particular in the appended claims. The improved sleeve itself, however, both as to its construction and the mode of making and using the same, together with additional features and advantages thereof, will be best understood upon perusal of the following detailed description of certain presently preferred specific embodiments with reference to the accompanying drawing.

BRIEF DESCRIPTION OF THE DRAWING

FIG. 4 is a perspective view of a modified sleeve which is shown in undeformed condition;

FIG. 5 is a perspective view of the modified sleeve in partly deformed condition of its tubular body in which the marginal portions flanking the slot of the tubular body are integrally connected with two aligned bridges;

FIG. 6 is a perspective view of a sleeve which constitutes a modification of the sleeve of FIG. 5;

FIG. 7 a perspective view of the sleeve of FIG. 5 and further shows a hood-shaped coupling device which can be used to confine the sections of the two bridges;

FIG. 8 is a sectional view of the coupling device as seen in the direction of arrows from the line A—A of FIG. 7;

FIG. 9 shows the coupling device of FIGS. 7 and 8 in operative position and the working end of a tool which can be used to detach the coupling device from the sections of the bridges;

DESCRIPTION OF PREFERRED EMBODIMENTS

Figure 1:
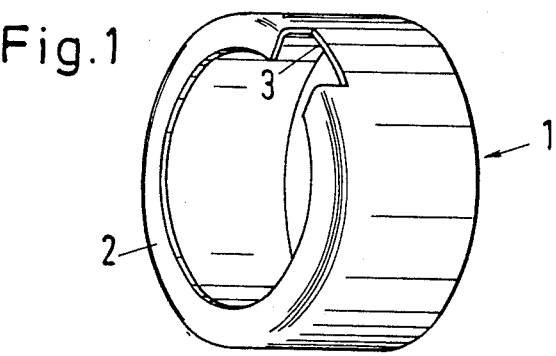
FIG. 1 is a perspective view of a sleeve which embodies one form of the invention and is shown in undeformed condition.

FIG. 1 shows a sleeve which is formed of sheet metal in a cold extrusion of deep drawing machine and includes a tubular body 1 with a radially inwardly extending annular flange 2 at one axial end. The flange 2 is provided with a recess 3 in the form of a substantially radially extending cutout which extends in part into the adjacent end of the tubular body 1. The recess 3 is or can be formed subsequent to completion of the deep drawing or cold extrusion operation which involves the shaping of the tubular body 1 and flange 2.

Figure 2:
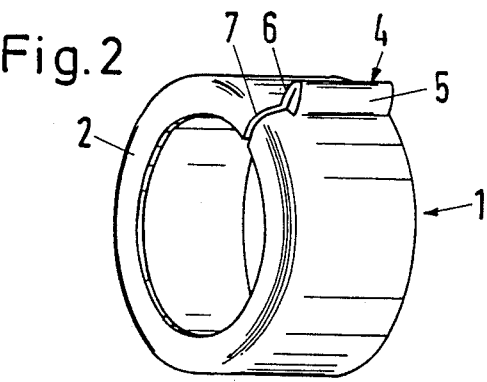
FIG. 2 is a similar perspective view of the sleeve in partly deformed condition in which the bridge between the marginal portions flanking the axially parallel slot of the tubular body of the sleeve is converted into a flat loop.

That portion of the tubular body 1 which is in axial alignment with the recess 3 is thereupon deformed to form a bridge 4 (FIG. 2) which extends radially outwardly beyond the peripheral surface of the thus obtained smaller-diameter tubular body 1 so that the edge faces flanking the narrowed recess 3 define an axially parallel slot 7. Those marginal portions of the tubular body 1 of FIG. 2 which flank the slot 7 are integral with the two mirror symmetrical sections 5, 6 of the bridge 4, and the radially outermost parts of the sections 5, 6 are integral with each other at a locus radially outwardly of the tubular body 1. The bridge 4 is a flattened loop which has a bight in the region where the sections 5, 6 are integral with each other. The width of the slot 7 which is shown in FIG. 2 is minimal or practically zero. In other words, conversion of the larger-diameter tubular body of FIG. 1 into the smaller-diameter tubular body 1 of FIG. 2 entails practically complete disappearance of the recess 3 so that the flange 2 of the smaller-diameter tubular body 1 of FIG. 2 can be said to constitute a split ring with little or no clearance between its end portions.

In the next step, the tubular body 1 of FIG. 2 is slipped onto one end portion of a flexible hose 8 (FIG. 3) so that the flange 2 overlies the end face of the hose, and the assembly of end portion of the hose 8 and sleeve is slipped onto the adjacent end of a tubular member 9, e.g., a nipple, so that the internal surface of the end portion of the hose surrounds the external surface of the tubular member. The external surface of the tubular member 9 can be provided with circumferentially extending corrugations to promote the retaining action between such external surface and the internal surface of the end portion of the hose 8 when the tubular body 1 is deformed to be provided with radially inwardly extending axially parallel depressions 10. Such depressions bring about an effective reduction of the inner diameter of the tubular body 1 with attendant deformation of adjacent portions of the hose 8 which is thereby held in sealing engagement with the tubular member 9. Other modes of effecting a radially inward deformation of the tubular body 1 can be resorted to with equal or similar advantage. All that counts is that the inner diameter of the tubular body 1 be reduced to an extent which is necessary to ensure the establishment of reliable mechanical and sealing connections between the end portion of the hose 8 and the surrounded part of the tubular member 9. The material of the tubular portion 1 is sufficiently thin, and the depressions 10 are sufficiently deep, to ensure adequate deformation of the entire end portion of the hose 8 into reliable sealing and mechanical engagement with the tubular member 9.

Figure 3:
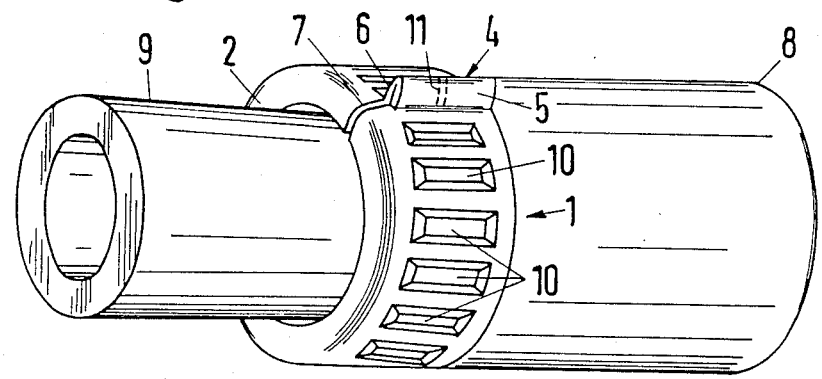
FIG. 3 is a perspective view of an assembled fitting wherein the fully deformed tubular body of the sleeve sealingly secures one end portion of a hose to one end of a tubular member.

The material and the wall thickness of the tubular body 1 are selected in such a way that the bridge 4 retains the shape which is shown in FIG. 2 during and subsequent to clinching of the tubular body to provide the latter with depressions 10. In other words, the outer diameter of the tubular body 1 does not or need not increase in response to deformation of the end portion of the hose 8 as a result of the making of depressions 10. The bridge 4 also retains its shape when the hose fitting of FIG. 3 is put to actual use, e.g., when a pressurized hydraulic or gaseous fluid is caused to flow from the tubular member 9 into the hose 8 or vice versa and the pressure prevailing in the hose tends to expand the tubular body 1 of the radially inwardly deformed sleeve.

If a person in charge wishes to remove the sleeve from the end portion of the hose 8, the integral connection between the section 5 or 6 of the bridge 4 and the tubular body 1 is terminated, e.g., by resorting to a saw which is used to make a cut between the section 5 or 6 and the respective marginal portion of the tubular body 1. Alternatively, the entire bridge 4 can be removed with a saw, with pliers or by resorting to any other suitable tool. The width of the slot 7 increases or can increase automatically in response to termination of integral connection between the section 5 or 6 of the bridge 4 and the respective marginal portion of the tubular body 1. If necessary, spreading or widening of the slot 7 can be enhanced with the working end of a screw driver or any other rudimentary tool.

Instead of severing one of the sections 5, 6 from the respective marginal portion of the tubular body 1, it is also possible to make in the bridge 4 at least one cut 11 (one indicated in FIG. 3 by broken lines) in order to divide the bridge 4 into two or more shorter bridges which can be more readily separated from the tubular body 1 by pliers, i.e., by flexing the narrower bridges back and forth and/or by twisting the bridges until the sections 5, 6 (actually the corresponding portions of such sections) break away from the adjacent marginal portions of the body 1. The flexing takes place about an axis which is located in the region of the slot 7 and is parallel to the axis of the tubular body 1.

If the material of the sleeve is not too thick, the entire bridge 4 can be severed from the body 1 by metal shears.

The sleeve of the hose fitting which is shown in FIG. 3 might require detachment for a number of reasons, for example, because it is necessary to gain access to the interior of the tubular member 9 and/or hose 8. Furthermore, it might be necessary to replace the hose 8 with a different hose, to attach the hose to another tubular member, or to cut off a portion of the hose prior to reattachment to the tubular member 9 or to another tubular member. Reattachment involves the utilization of another sleeve of the type shown in FIG. 2 or the utilization of any other (conventional) coupling device in the form of a flexible strap or the like.

An advantage of the sleeve which embodies the tubular body 1 and the bridge 4 is that it can be made of a single piece of metallic sheet material. This is due to the fact that the sections 5, 6 of the bridge 4 are integral with the respective marginal portions of the tubular body 1 and that the sections 5, 6 of the bridge are also integral with each other. Moreover, this simplifies the making of the bridge 4 because it is merely necessary to reduce the width of the recess 3 in order to form the slot 7; this automatically entails the formation of the bridge 4 and results in requisite reduction of the diameter of the tubular body 1 preferably in such a way that the latter can be barely but still readily slipped onto the end portion of the hose 8 preparatory to insertion of the tubular member 9 into the end portion of the hose.

The characteristics of the material of the sleeve and the thickness of the tubular body 1 and sections 5, 6 are selected with a view to ensure that the bends between the sections 5, 6 and the respective marginal portions of the tubular body 1, as well as the flattened bight of the loop which constitutes the bridge 4, are strong enough to withstand deforming stresses which develop when the sleeve is in actual use, for example, in a manner as shown in FIG. 3.

An advantage of the flange 2 is that the person in charge or a robot can readily move the sleeve to an optimum axial position with reference to the end portion of the hose 8. Thus, the flange 2 can be moved all the way into actual contact with the end face of the hose.

FIG. 4 shows a sleeve-like blank which can be converted into the sleeve of FIG. 5 or 6. The tubular body 1a of the blank of FIG. 4 has a recess 3 which is in line with a rectangular window-like cutout 12 in the blank, and three additional radially extending recesses or cutouts 13 which are provided in the flange 2 and are spaced apart from each other in the circumferential direction of the tubular body 1a. When the blank of FIG. 4 is converted into the sleeve of FIG. 5, the width of the window 12 is reduced (either partially or to zero) and the two webs of sheet material which are in line with the recess 3 are converted into two discrete bridges 4a which are disposed one behind the other in the longitudinal direction of the thus obtained slot 7, i.e., in the axial direction of the tubular body 1a of FIG. 5. The width of one of the bridges 4a (as seen in the axial direction of the tubular body 1a) can but need not match the width of the other bridge 4a. The sections 5a, 6a of each of the two bridges 4a are integral with each other as well as with the respective marginal portions of the tubular body 1a.

The thickness and strength of the material of the tubular body 1a and of the sections 5a, 6a are selected in such a way that the width of the slot 7 does not increase (or does not appreciably increase) when the tubular body 1a is thereupon provided with depressions (such as the depressions 10 in the tubular body 1 of FIG. 1) in order to reduce the inner diameter of the tubular body 1a and to securely hold an end portion of a hose on the inserted tubular member.

Since the bridges 4a are relatively narrow, each of these bridges can be readily broken off the tubular body 1a by resorting to pliers. Alternatively, the bridges 4a can be separated from the tubular body 1a by shears or by sawing the sections 5a, 6a off the adjacent marginal portions of the tubular body 1a. The slot 7 is then ready to be widened, for example, by inserting the working end of a screwdriver into the window 12 and by turning the working end in the window.

The embodiment of FIGS. 4 and 5 exhibits the advantage that the bridges 4a can be more readily separated from the tubular body 1a. On the other hand, the sleeve of FIGS. 1 to 3 is simpler and its single bridge 4 is stronger than the bridges 4a.

The sleeve of FIGS. 4–5 can be modified by providing it with three or even more bridges, depending upon the axial length of the tubular body 1a and on the strength of the material of the sleeve.

The resistance of bridges 4a to undesirable widening of the slot 7 can be enhanced by the simple expedient of bending the bridges 4a in a manner as shown in FIG. 6, i.e., so that the sections 5a or 6a overlie the respective marginal portion of the tubular body 1a and that the sections 6a or 5a overlie the respective sections 5a or 6a. This exhibits the additional advantage that the bridges 4a are not in the way and that the entire sleeve occupies less room in the radial direction of the tubular body 1a. The sections 5a which are shown in FIG. 6 can actually contact the peripheral surface of the tubular body 1a or can be moved to positions between those which are shown in FIGS. 5 and 6.

The bridges 4a of FIG. 6 can be at least partially separated from the tubular body 1a in the illustrated positions, e.g., by making cuts with a saw between the sections 6a and the respective marginal portion of the tubular body 1a, or by bending the bridges 4a back to the radial positions of FIG. 5 prior to partial or complete separation with shears, pliers, a saw or in any other suitable way.

The purpose of the recesses 13 is to facilitate radial expansion of the tubular body 1a when the connection between the bridges 4a and at least one marginal portion of the tubular body 1a is destroyed. Such recesses ensure that the flange 2 offers a less pronounced resistance to expansion of the tubular body 1a. The number of recesses 13 can be reduced to one or two or increased to four or more.

FIG. 7 shows the sleeve of FIG. 5 and a hood-shaped coupling device 14 which can be moved in the direction of arrow 15 to confine the bridges 4a and to thus greatly reduce the likelihood of accidental or unintentional widening of the slot 7 when the hose fitting employing the sleeve of FIG. 7 is in actual use. The coupling device 14 has two elongated parallel sidewalls 16 and 17 which flank the bridges 4a when the device 14 is properly applied in a manner as shown in FIG. 9. The median portions of sidewalls 16, 17 can be deformed to enter the adjacent portions of the window 12 and to thus prevent accidental separation of the coupling device 14 from the bridges 4a.

In order to remove the coupling device 14, the working end 19 of a screwdriver 18 is inserted into the window 12 and is manipulated to slip the coupling device off the bridges 4a. Once the device 14 is detached, the bridges 4a can be separated from the tubular body 1a, either entirely or in part, in a manner as described with reference to FIG. 5.

Deformation of the sidewalls 16, 17 can be carried out for the purpose of promoting frictional engagement between the internal surfaces of such sidewalls and the adjacent sections 6a, 5a of the bridges 4a, and/or for the purpose of establishing a pronounced form-locking engagement between the device 14 and other parts of the sleeve.

The hood-shaped coupling device 14 can be replaced with an annular coupling device (e.g., with a device similar to that shown at 14b in FIGS. 10 and 11) which is thereupon deformed to resemble the number eight in that portions of such annular coupling device extend into the space or clearance between the two bridges 4a.

A hood-shaped or a different (e.g., annular) coupling device can also be used in the embodiment of FIGS. 1 to 3 to reduce the likelihood of unintentional widening of the slot 7 when the sleeve is in actual use.

Figure 10:
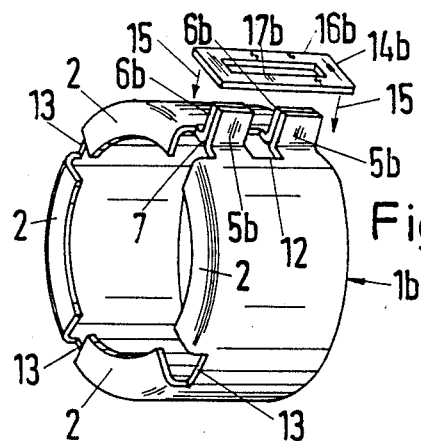
FIG. 10 is a perspective view of a further sleeve and of an annular coupling device which can be applied to surround the sections of the two bridges.

FIG. 10 shows a partially deformed sleeve having a tubular body 1b which is identical with the tubular body 1a of FIGS. 5 to 7 except that the sections 5b, 6b of the two bridges are not integral with each other. In other words, the sections 5b, 6b of each of the two bridges merely lie flat against each other but their radially outermost portions are not integrally connected to one another. In order to prevent accidental widening of the slot 7, the sleeve of FIG. 10 further comprises an annular coupling device 14b which can be slipped onto the two bridges in the direction of arrow 15 so that its parallel elongated portions 16b, 17b flank the bridges and are adjacent the marginal portions of the tubular body 1b. The sections 5b, 6b are then bent to overlie the adjacent portions 17b, 16b of the device 14b in a manner as shown in FIG. 11 which greatly enhances the ability of the bridges to resist unintentional widening of the slot 7.

Figure 11:
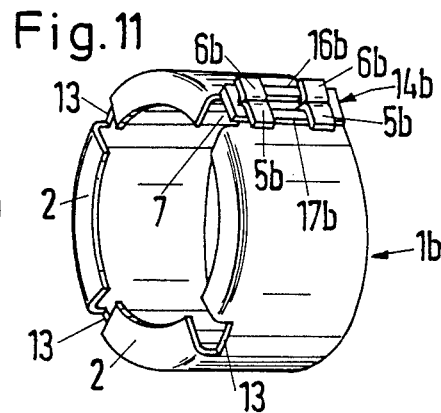
FIG. 11 shows the structure of FIG. 10 with the coupling device in operative position and with the sections of the bridges bent to overlie the coupling device.

In order to detach the sleeve of FIG. 11 from the end portion of a hose, the sections 5b, 6b are severed from the respective marginal portions of the tubular body 1b in the positions which are shown in FIG. 11. Alternatively, the sections 5b, 6b can be bent back to the radial positions of FIG. 11 so that the annular coupling device 14b can be removed counter to the direction which is indicated by the arrow 15 and the tubular body 1b is ready to be expanded by widening the slot 7 so that the sleeve can be slipped off the end portion of a hose.

An advantage of the annular coupling device 14b is that it is simpler and less expensive and requires less material than the hood-shaped coupling device 14. On the other hand, the device 14 can offer much greater resistance to unintentional expansion of the slot 7.

Figure 12:
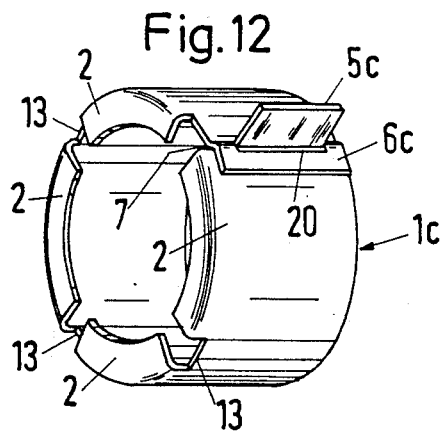
FIG. 12 is a perspective view of another sleeve wherein the bridge has two sections which are formlockingly connected to each other.

FIG. 12 shows a sleeve wherein the marginal portions of the tubular body 1c are integral with the sections 5c, 6c of a single bridge. The sections 5c, 6c are form-lockingly connected to each other in that one of the sections (such as the section 6c) is formed with an elongated slit 20 which is parallel to the axis of the tubular body 1c and the other section (5c) extends through the slit and radially outwardly of the tubular body 1c. The section 6c overlies that marginal portion of the tubular body 1c which is integral with the section 5c. The strength of the two-piece bridge of FIG. 11 can be enhanced by bending the section 5c (FIG. 13) so that it overlies the respective marginal portion of the tubular body 1c and that it also overlies the section 6c. The length of the slit 20 need not appreciably exceed the width of the section 5c, and the width of this slit need not appreciably exceed the thickness of the material of the tubular body 1c (i.e., of the section 5c).

The section 6c is substantially S-shaped in that it is provided with an internal shoulder in the region of the marginal portion which is integral with the section 5c. This ensures that only a portion (namely the outer portion) of the section 6c extends radially outwardly beyond the peripheral surface of the tubular body 1c. The width of the shoulder of the section 6c (in the radial direction of the tubular body 1c) equals or approximates the thickness of the material of the sleeve.

Figure 13:
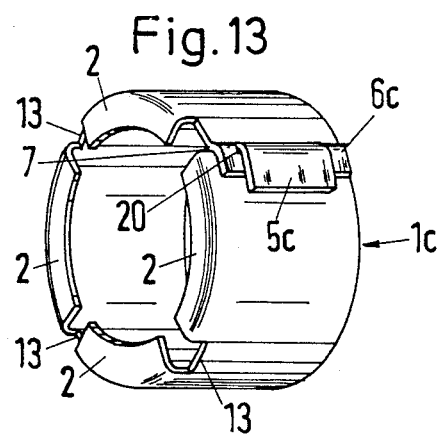
FIG. 13 shows the structure of FIG. 12, with one section of the bridge bent over the other section.

An advantage of the feature which is shown in FIG. 13 is that the sleeve occupies less room in the radial direction of the tubular body 1c because the section 5c overlies the free end portion of the section 6c. In addition, such orientation of the section 5c ensures that the two-piece bridge of FIG. 13 can offer pronounced resistance to unintentional widening of the slot 7.

The sleeves which are shown in FIGS. 10 to 13 (as well as the sleeves of FIGS. 14 to 16) can be made from flat elongated blanks of suitable sheet material which can be extruded in unheated condition or deep drawn to be converted into sleeves and to permit further (radially inward) deformation for the purpose of performing the function of the sleeve which is shown in FIG. 3.

In order to separate the sleeve of FIG. 13 from the end portion of a hose or the like, the section 6c can be severed in the region of the slot 7 or the section 5c can be bent back to or even beyond the position of FIG. 12 in order to enable the section 6c to slide toward the free end of the thus bent section 5c and to thereby increase the inner diameter of the tubular body 1c.

An advantage of the sleeve which is shown in FIGS. 12 and 13 is that the sections 5c, 6c of the bridge can be separated from each other without the need to use a saw or another cutting implement. Thus, it is possible to reuse the sleeve of FIGS. 12 and 13. This also applies for the embodiment of FIGS. 10 and 11.

Figure 14:
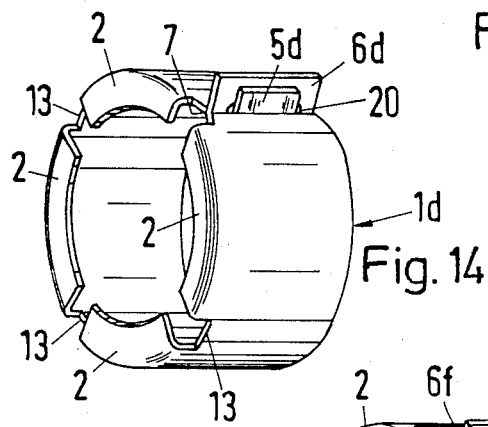
FIG. 14 is a perspective view of a sleeve which constitutes a modification of the sleeve of FIGS. 12 and 13.

FIG. 14 shows a sleeve having a tubular body 1d which is identical with the tubular body 1c, and a bridge having two sections 5d, 6d each of which is integral with one of the two marginal portions of the tubular body 1d. The section 6d is bent radially outwardly prior to or after introduction of section 5d into the slit 20 of the section 6d, and the section 5d is thereupon bent to extend radially outwardly of the tubular body 1d. The sections 5d, 6d can be coupled to each other by an annular device (such as the device 14b of FIGS. 10 and 11) or by a hood-shaped device (such as the device 14 of FIGS. 7 to 9).

The width of the slot 7 can be increased after the section 5d and/or 6d is severed from the tubular body 1d or subsequent to bending of the section 5d to a position in which the form-locking connection between the sections 5d, 6d can be terminated by extracting the section 5c from the slit 20. The section 5d is automatically expelled from the slit 20 if the width of the slot 7 is increased subsequent to bending of the section 5d to a position in which it overlies that marginal portion of the tubular body 1d which is integral with the section 6d.

Figure 15:
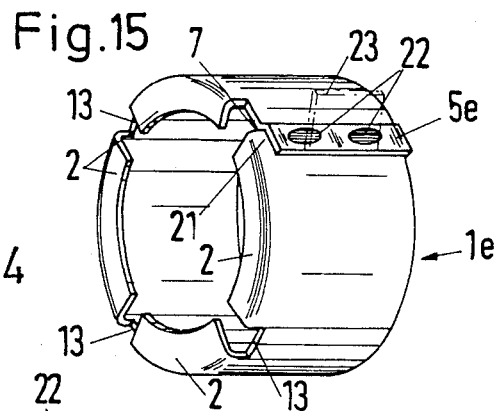
FIG. 15 is a perspective view of an additional sleeve wherein the single section of the bridge is spot welded to one marginal portion of the tubular body.

The bridge of the sleeve which is shown in FIG. 15 has a single section 5e which is integral with one marginal portion of the tubular body 1e at one side of the slot 7 and overlies the other marginal portion 21 of the tubular body 1e at the other side of the slot. The means for connecting the single section 5e to the marginal portion 21 includes means for permanently bonding this section to the tubular body 1e. To this end, two relatively small portions of the section 5e are spot welded to the marginal portion 21, as at 22. It is often sufficient to provide a single spot-welded connection or it might be advisable to provide more than two spot-welded connections.

In order to expand the tubular body 1e, the free end of the single section 5e is engaged by pliers and the section 5e is pulled away from the marginal portion 21 to destroy the spot-welded connections 22. Alternatively, the section 5e can be severed from the other marginal portion of the tubular body 1e by resorting to shears, to a saw or to any other suitable tool.

Destruction of the connections 22 by pliers is facilitated if the section 5e is provided with an extension in the form of a lug 23 (indicated in FIG. 15 by phantom lines) which can extend radially outwardly, as actually shown, or which can be bent to overlie the external surface of the tubular body 1e adjacent the marginal portion 21. The extension 23 is then bent to the position of FIG. 15 prior to being engaged by the jaws of pliers for the purpose of destroying the connections 22.

Instead of resorting to pliers, a person wishing to destroy the connections 22 can employ a wedge which is driven between the marginal portion 21 and the section 5e, for example, between the two spot welds 22.

An advantage of the sleeve which is shown in FIG. 15 is that it employs a very simple bridge. On the other hand, it is necessary to use a welding machine in order to bond the single section 5e of the bridge to the marginal portion 21 of the tubular body 1e.

The connection including the spot welds 22 can be replaced with a bonded connection which is established by resorting to a suitable adhesive.

Figure 16:
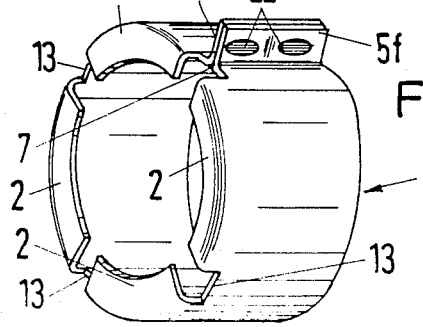
FIG. 16 is a perspective view of a sleeve which constitutes a modification of the sleeve of FIGS. 1 to 3.

FIG. 16 shows a sleeve which has a tubular body 1f and a single bridge including two radially outwardly extending sections 5f and 6f, each integral with the respective marginal portion of the tubular body. The sections 5f, 6f lie side-by-side and are bonded to each other by two spot welds 22. The welds 22 can be replaced with rivets or can be used jointly with one or more rivets. The sections 5f and 6f can be provided with extensions (corresponding to the extension 23 of FIG. 15) in order to facilitate destruction of the welds 22 with two pliers each of which engages one of the extensions. Alternatively, at least one of the sections 5f, 6f can be severed from the respective marginal portion of the tubular body 1f.

The blanks which are used to make the sleeves of FIGS. 10 to 16 can be mass-produced in a stamping machine. Each blank is already provided with the section (5e) or sections (5b, 6b or 5c, 6c or 5d, 6d of 5f, 6f) of the respective bridge.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A sleeve for securing one end of a tubular member to the end portion of a hose, comprising a radially inwardly deformable tubular body arranged to surround the end portion of the hose and to urge the end portion against the one end of the tubular member as a result of radially inward deformation thereof, said body having a substantially axially parallel slot and including two marginal portions flanking said slot; and at least one bridge extending across said slot externally of said body and including two sections each of which is integral with a different one of said marginal portions, said sections extending substantially radially outwardly from said body and the connection between said at least one bridge and at least one of said marginal potions being a separable connection to permit widening of said slot preparatory to separation of deformed body from the end portion of the hose, said at least one bridge further including means for coupling said sections to each other and said coupling means comprising a hood which confines said sections.

2. The sleeve of claim 1, wherein said sections are integral with each other.

3. The sleeve of claim 1, comprising a plurality of bridges one behind the other in the longitudinal direction of said slot.

4. The sleeve of claim 3, wherein said bridges include a first and a second bridge with a clearance between said first and second bridges, said coupling means including a portion extending into said clearance.

5. The sleeve of claim 1, wherein said tubular body has a first and a second axial end and further comprising a flange integral with one of said ends and extending substantially radially inwardly of said body.

6. The sleeve of claim 5, wherein said flange is an annular flange and has at least one substantially radial recess spaced apart from said slot in the circumferential direction of said body.

* * * * *